United States Patent
Nolin (10) Patent No.: US 10,544,614 B2
(45) Date of Patent: Jan. 28, 2020

(54) GRAIN GATE SWING ARM

(71) Applicant: Karl W Nolin, Spencer, IA (US)

(72) Inventor: Karl W Nolin, Spencer, IA (US)

( * ) Notice: Subject to any disclaimer, the term of this patent is extended or adjusted under 35 U.S.C. 154(b) by 0 days.

(21) Appl. No.: 15/843,585

(22) Filed: Dec. 15, 2017

(65) Prior Publication Data

US 2018/0171695 A1 Jun. 21, 2018

Related U.S. Application Data (60) Provisional application No. 62/434,562, filed on Dec. 15, 2016.

(51) Int. Cl.
| | |
|---|---|
| *E05F 11/14* | (2006.01) |
| *B65G 67/24* | (2006.01) |
| *E05F 11/54* | (2006.01) |

(52) U.S. Cl.
CPC .............. *E05F 11/14* (2013.01); *B65G 67/24* (2013.01); *E05F 11/54* (2013.01); *E05Y 2900/40* (2013.01)

(58) Field of Classification Search
CPC ........... E05F 11/14; E05F 11/54; B65G 67/24
USPC .................................................. 414/519, 414
See application file for complete search history.

(56) References Cited

U.S. PATENT DOCUMENTS

| | | | | |
|---|---|---|---|---|
| 1,398,649 A | * | 11/1921 | Richards | F23K 3/00 414/519 |
| 3,224,813 A | * | 12/1965 | Jezo | B28C 7/062 406/64 |
| 3,391,812 A | * | 7/1968 | Heider | B60P 1/24 414/505 |
| 5,108,249 A | * | 4/1992 | Kinzenbaw | B60P 1/38 414/519 |
| 5,353,713 A | * | 10/1994 | Dohr | B61D 7/26 105/282.3 |
| 5,448,955 A | * | 9/1995 | Dugge | B61D 7/20 105/282.3 |
| RE35,925 E | * | 10/1998 | Dohr | B61D 7/26 105/310 |
| 6,073,562 A | * | 6/2000 | Cozine | B61D 7/20 105/247 |
| 6,095,616 A | * | 8/2000 | Grieshop | B61D 7/00 298/27 |
| 6,263,803 B1 | * | 7/2001 | Dohr | B61D 7/20 105/282.1 |

(Continued)

OTHER PUBLICATIONS

2015 Nolin Milling, Inc. Booklet: Rod Pull Roller Gates and Remote Activators.
2017 Nolin Milling, Inc. Catalog.

*Primary Examiner* — Kaitlin S Joerger
(74) *Attorney, Agent, or Firm* — Simmons Perrine Moyer Bergman PLC (57) ABSTRACT

A mechanism for precisely controlling a slide gate to provide certain and secure location of a sliding gate in a path of flowable dry bulk material, the mechanism including a rack and pinon gear with a shaft with a diameter hole therethrough for receiving a pin therethrough when the sliding gate is in a desired position. The swing arm is configured to inhibit removal of the pin and thereby prevent unwanted movement of the gate from the desired position. The swing arm is configured for selectively prohibiting accidental and/or intentional but unauthorized removal of the pin depending upon types of objects being placed through the open hole in the swing arm and the first fixed arm open hole.

12 Claims, 6 Drawing Sheets

(56) References Cited

U.S. PATENT DOCUMENTS

| | | | |
|---|---|---|---|
| 6,571,718 B2* | 6/2003 | Lucas | B61D 7/20 105/282.3 |
| 7,222,714 B2* | 5/2007 | Lilly | B65G 47/78 198/359 |
| 8,763,323 B1* | 7/2014 | Even | E04H 7/22 52/192 |
| 9,950,713 B2* | 4/2018 | Senn | B61D 7/02 |
| 10,059,513 B1* | 8/2018 | Schlagel | E06B 11/045 |
| 2011/0029205 A1* | 2/2011 | Ricketts | A01D 41/1217 701/50 |

\* cited by examiner

GRAIN GATE SWING ARM

CROSS REFERENCE TO RELATED APPLICATIONS

This application claims the benefit of a provisional application filed on Dec. 15, 2016, and having Ser. No. 62/434,562 entitled "GRAIN GATE SWING ARM" which is hereby incorporated herein in its entirety by this reference.

FIELD OF THE INVENTION

The present invention generally relates to grain handling and storage, and more particularly relates to grain gates, and, even more particularly, relates to a swing arm lock operatively associated with a sliding grain gate.

BACKGROUND OF THE INVENTION

In recent years, grain elevators and feed mills have necessarily become increasingly efficient in their operations. Many elevators and feed mills seek to improve their operations in many various aspects. Consequently, improvements in prior art systems are much desired.

In the past, grain handling equipment manufacturers have utilized rack and pinon gates for controlling flow of material through an opening. Examples of such gates can be found in the 2017 catalog of Nolin Milling, Inc. of Dickens, Iowa, on the web at www.nolinmilling.com. More specifically, remote activators for rod pull gates and vertical mount gates have been used in the past and can be found on page 9 of the above referenced catalog. It should be understood that the present invention also provides utility for prior art rack and pinon ceiling gates or other gates where the activator is located at the gate and the rack is incorporated into the gate itself.

While these gates have enjoyed much success in various locations and orientations and have been used extensively in the past, they are capable of improvement.

Consequently, there exists a need for improved methods and systems for securely delivering and controlling delivery rates of dry bulk material through a gate with predetermined gate opening size characteristics.

SUMMARY OF THE INVENTION

It is an object of one aspect of the present invention to provide a slide gate with a capability for securely fixing a gate opening size characteristic at any of: fully open, fully closed and numerous predetermined intermediate levels therebetween.

It is a feature of one aspect of the present invention to utilize a shaft with a predetermined shaft pin orifice therethrough, a pin and a pin locking mechanism.

It is an advantage of the present invention to provide for a capability of easily securing a gate opening size characteristic at any one of numerous predetermined levels.

It is additional feature of the present invention to provide a swing arm pin locking mechanism.

It is an additional advantage of this embodiment of the present invention to reduce the time required to securely fix a gate opening size characteristic at a predetermined level.

Accordingly, the present invention is:

A method for precisely controlling a rate of receiving grain from a grain truck by precisely controlling and then securing a variably sized opening of a gate for permitting flow of dry bulk particulate matter, comprising the steps of:

providing a grain truck 100;
providing a grain pit 200;
providing a grain handling system 500;
providing a rack 314;
providing a grain gate, coupled to said rack and configured for translating with said rack;
providing rotatable pinon gear 480;
providing a shaft 470 coupled to said rotatable pinon gear;
rotating said shaft and thereby translating said rack and varying a gate opening size characteristic; and
securing with a lock said shaft and thereby restricting variation of said gate opening size characteristic.

Additionally, the present invention is A grain gate system comprising:
a rack;
a grain gate, coupled to said rack and configured for translating with said rack;
a rotatable pinon gear;
a shaft coupled to said rotatable pinon gear;
a rigid sleeve member, with an exit hole therethrough;
a pin;
wherein said shaft is sized and configured to permit therethrough a diameter hole sized and configured to permit portions of said pin to pass through said diameter hole;
disposed on said sleeve, a first fixed arm with first fixed arm open hole, and a second fixed arm;
a swing arm rotatably coupled to said second fixed arm, where said swing arm has a pivot hole and a swing arm open hole; and
said swing arm being sized and configured so that said swing arm open hole is alignable with said first fixed arm open hole.

DETAILED DESCRIPTION

Figure 1:
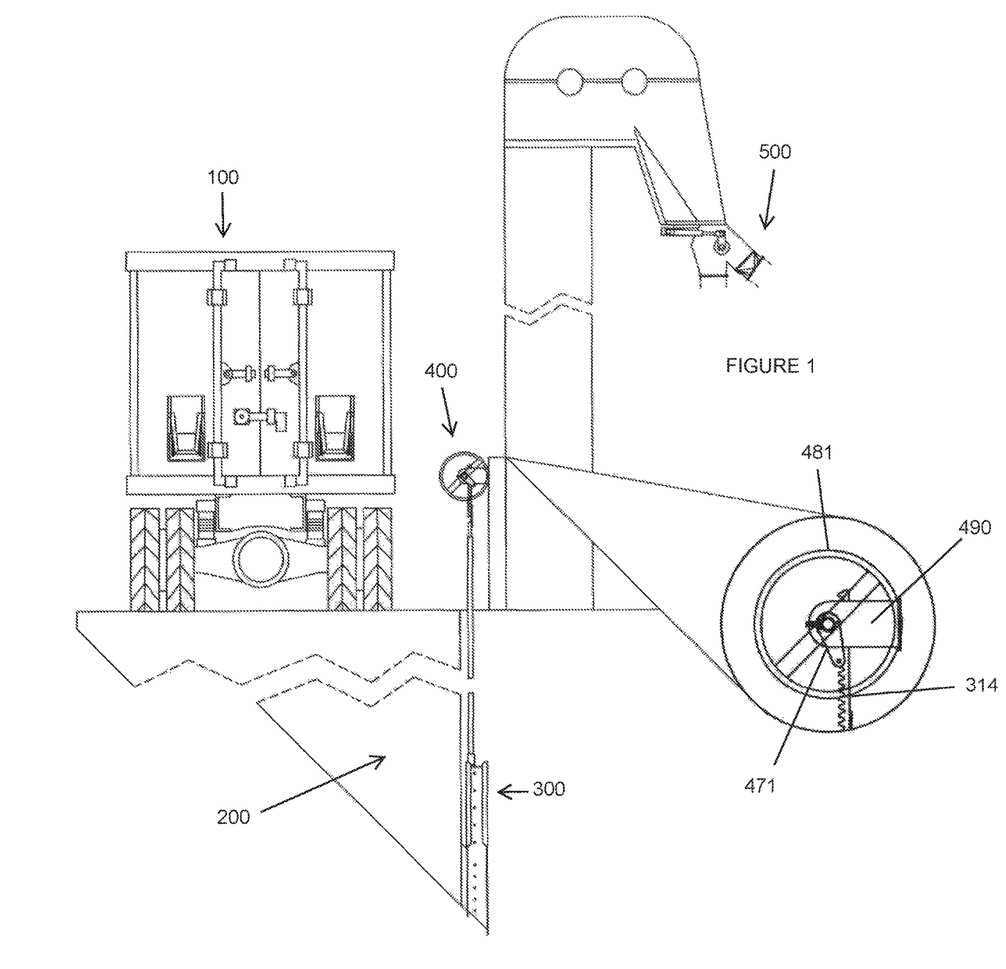
FIG. 1 is a representation of portions of grain transportation, handling and storage systems of the present invention.

Now referring to the drawings wherein like numerals refer to like matter throughout and more particularly referring to FIG. 1, which is a pictorial representation of an embodiment of the present invention in its intended environment. The details of the operation of much of this system are known to those skilled in the art. There is shown a grain truck 100, a grain pit 200, a grain gate 300, a remote activator system 400, and a grain handling system 500.

Figure 2:
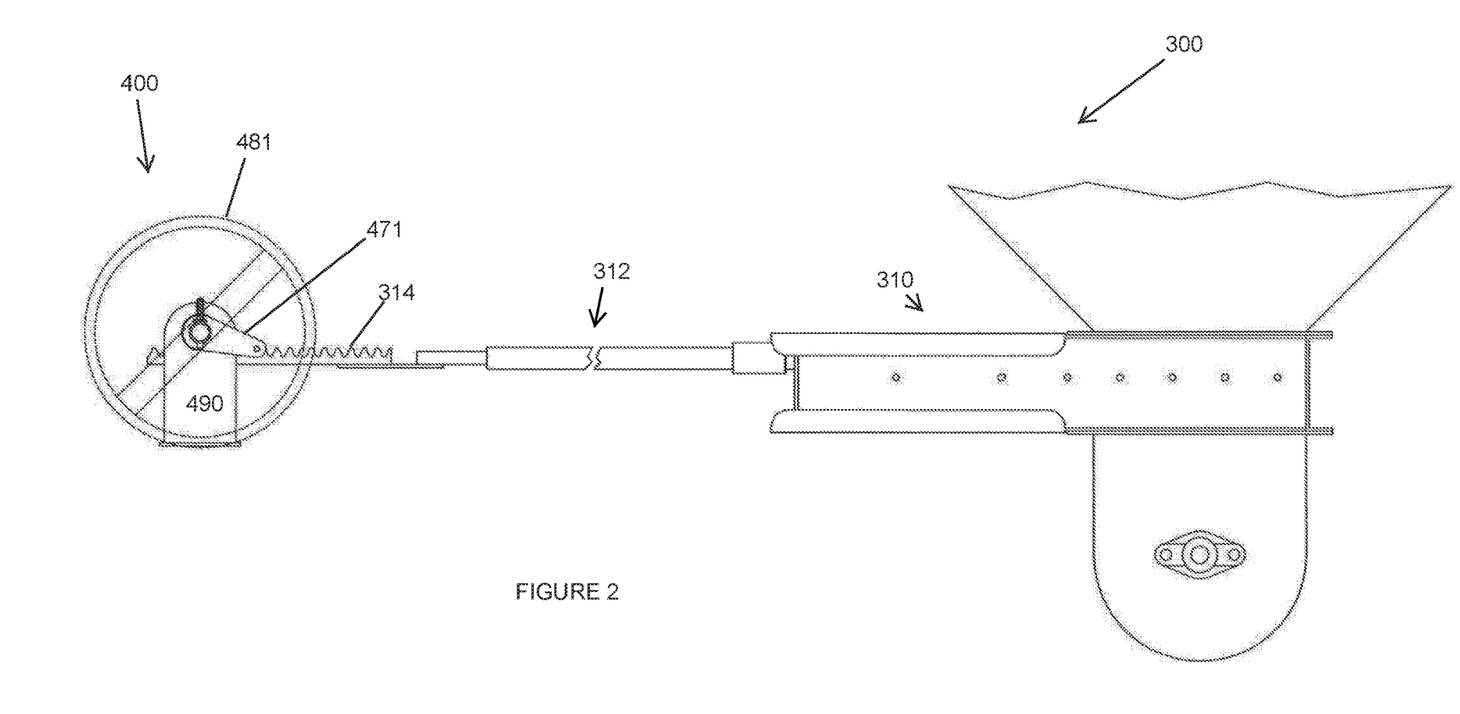
FIG. 2 is a close up view of a vertical pit gate system of FIG. 1.

Now referring to FIG. 2, there is shown a grain gate 300 including a grain gate frame 310, sized and configured for retaining a replaceable grain gate, an extension rod 312 and a toothed rack 314, which is inserted into the remote actuation system, 400 which includes a shroud 490 and a first latch arm 471.

Figure 3:
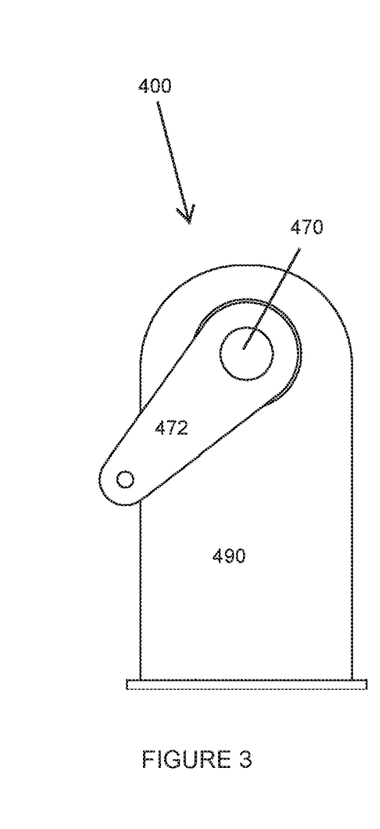
FIG. 3 is first side view of a portion of the FIG. 1.
Figure 4:
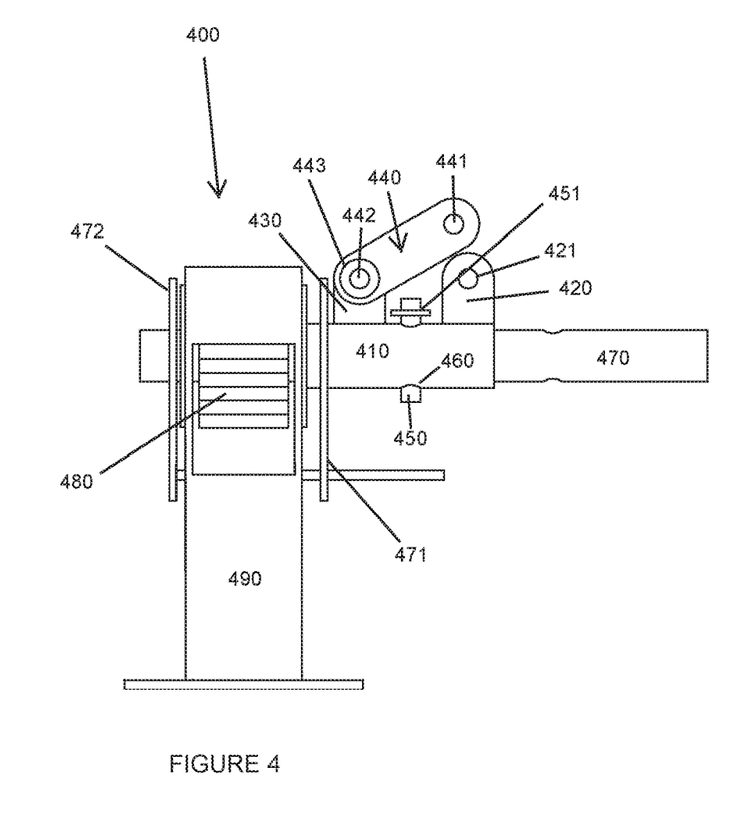
FIG. 4 is an end view of portions of FIG. 1.
Figure 5:
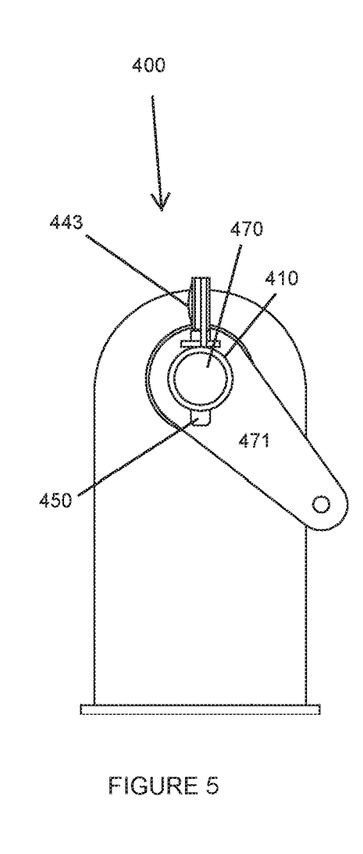
FIG. 5 is a second side view of a portion of FIG. 1.

Now referring to FIG. 3, there is shown a side view of the remote activator of the present invention including shroud 490 and a second latch arm 472 with a central shaft 470. Much of FIGS. 3, 4 and 5 are very similar to the prior art Remote Activator described in the catalog mentioned above. The first latch arm 471 and the second latch arm 472, together with the handle extending therebetween and protruding beyond first latch arm 471 in combination form a one-directional rack latch, which restricts translation of the rack along its longitudinal axis in a first direction, but permits movement in an opposing direction.

Now referring to FIG. 4, there is shown an orthogonal view of the system shown in FIG. 3. Which includes: sleeve 410 (which is preferably welded to the housing 490 or other stationary object), first fixed arm 420, second fixed arm 430 and swing arm 440 as well as a pin 450, extending through a hole 460 in sleeve 410. As was done in the prior art remote activator, disposed within shroud 490 is a pinon gear 480 coupled to shaft 470. The gate opening size adjustment operates as in prior art remote activators, as follows: the shaft 470 is rotated by a hand wheel (shown in FIG. 2) which rotates the pinon gear 480 which engages and moves the toothed rack 314 and the elongated rod 312 which causes the gate to open and close depending on direction of rotation of the hand wheel. The present invention allows for securely fixing the gate opening size characteristic when the desired amount of gate opening size is attained, pin 450 is inserted through a diameter hole through the shaft 470, which diameter hole is sized and configured to permit pin 450 to slide therethrough when said diameter hole is in registration with hole 460 in the sleeve. Swing arm 440 is now capable of being pivoted over the top of pin handle end 451 of pin 450 and the hole 441 in the swing arm 440 can be made to be in registration with hole 421 in the first fixed arm 420. A paddle lock (not shown) can be positioned through orifices 441 and 421. It should be understood that this is one preferred means for locking the pin 450 in place and preventing unauthorized removal of the same. However, other pin locking means could be substituted if desired. For example, including a pin locking end attachment disposed on an opposite side of pin 450 from pin handle end 451, or suitable substitutes could be utilized.

The following components are new with respect to the prior art activator: pin 450, sleeve 410 with hole 460 therethrough, first fixed arm 420, second fixed arm 430, swing arm 440 with holes 441 and 442 therein and a swivel rivet or suitable substitute 443 to provide the ability of swing arm 440 to pivot about second fixed arm 430. First latch arm 471 will likely need a larger opening to accommodate the addition of the sleeve 410 around shaft 470.

Now referring to FIG. 5, there is shown a view of the opposing side of shroud 490 in FIG. 3. The end of shaft 470 and the end of sleeve 410 occlude a view of portions of the pin 450 which are located in the diameter hole through shaft 470 and in the hole 460 in sleeve 410.

Figure 6:
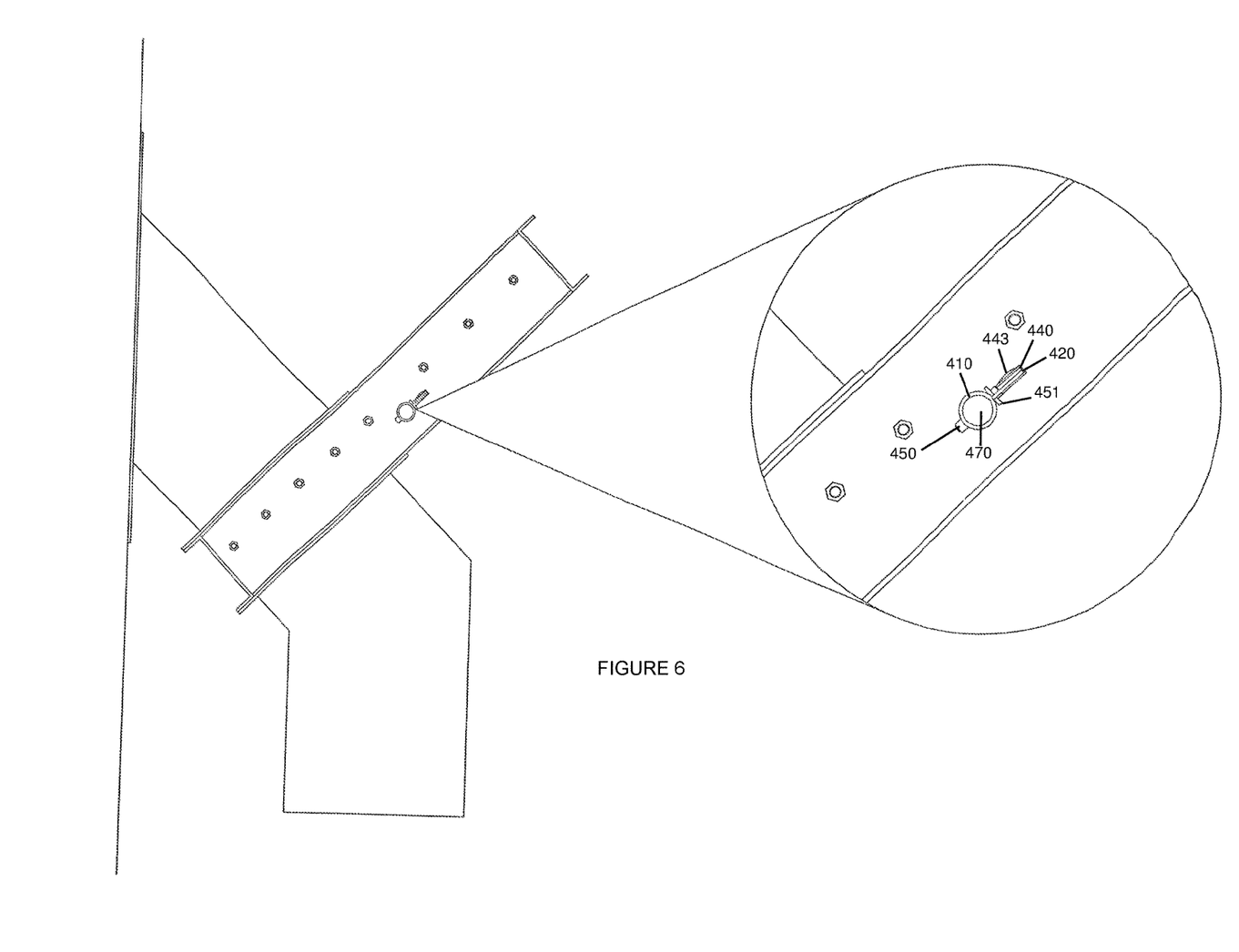
FIG. 6 is a view of a portion of another embodiment the present invention in a non-vertical application.
Figure 7:
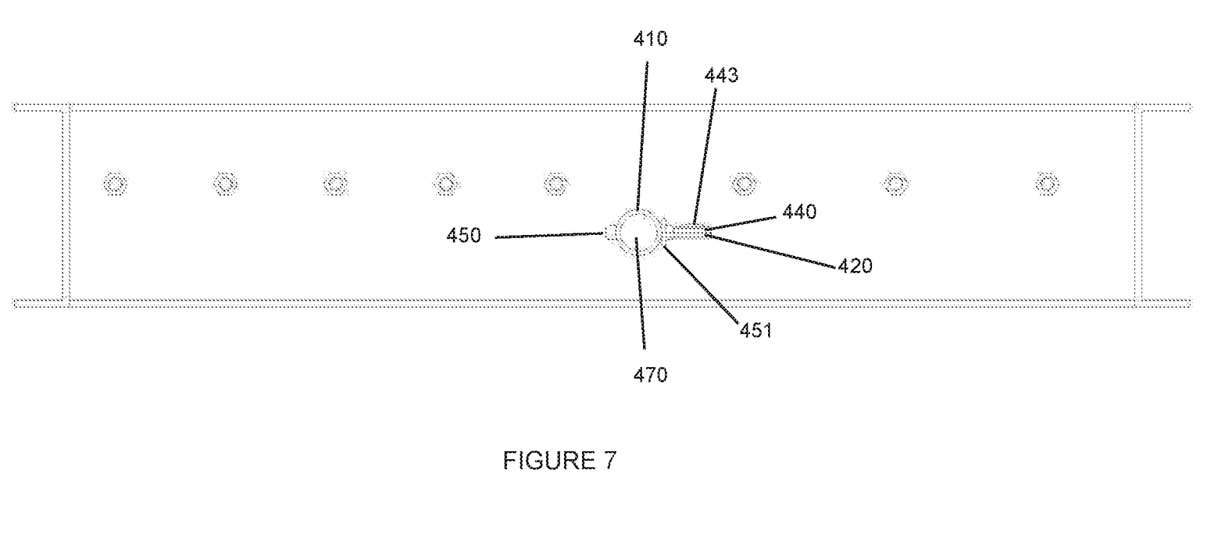
FIG. 7 is a close up view of a side view of the embodiment of the present invention in FIG. 6.

Now referring to FIGS. 6 and 7, there is shown a new ceiling roller gate of the present invention, which includes very similar, if not identical, components in some applications to the parts shown and described in FIGS. 1-5, including but not limited to sleeve 410, with hole 460, therethrough to receive therein pin 450. Note the hand wheel 481 of FIGS. 1, 2 and 8 is not shown but would be used.

Figure 8:
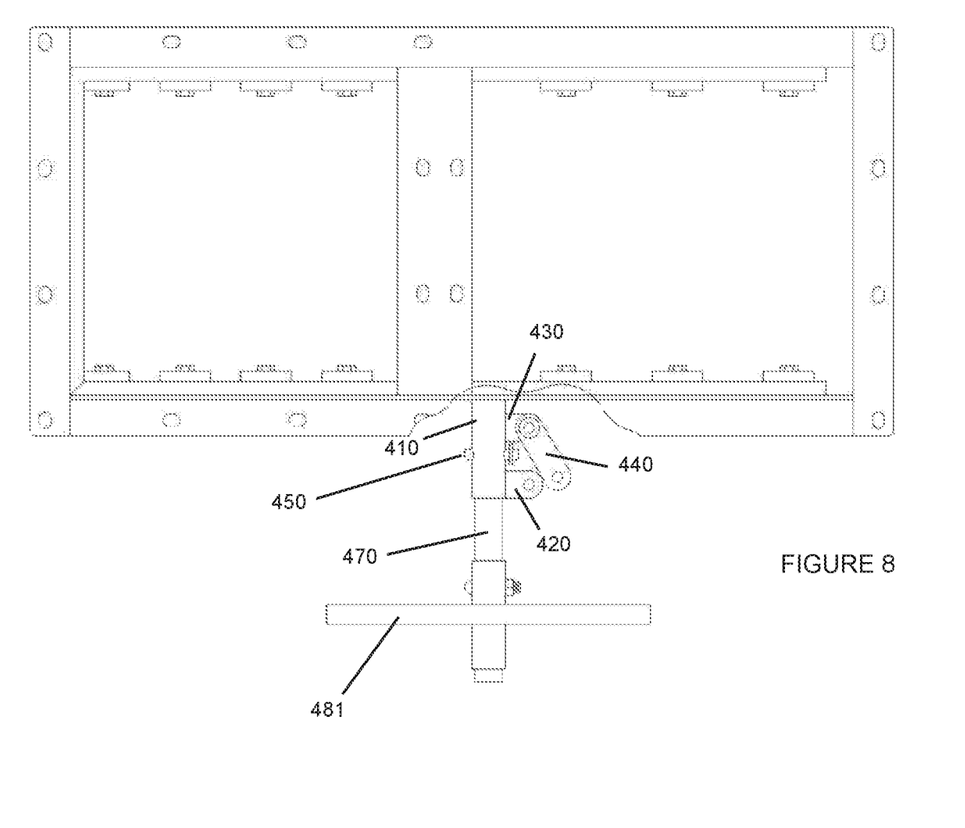
FIG. 8 is top view of the embodiment of FIGS. 6 and 7.

Now referring to FIG. 8, there is a top view of a ceiling gate, where the rack is not shown because it is preferably attached to a central portion on a back side of the gate panel (not shown). Also not shown is the pinon gear 480. All of which could be identical to the gate panel, rack and pinon gear used in prior art ceiling gates included in the catalog discussed above.

While throughout this discussion a welded sleeve 410 has been proposed as a means for rotationally locking the shaft 450, it should be understood that in some applications, such as a lower cost application a partially cylindrical, half pipe, or other non-cylindrical rigid member could be coupled to the housing 490 or any stationary object and with a pin hole similar to hole 460 serve as a means for rotationally locking the shaft.

It is thought that the method and apparatus of the present invention will be understood from the foregoing description and that it will be apparent that various changes may be made in the form, construct steps and arrangement of the parts and steps thereof without departing from the spirit and scope of the invention or sacrificing all of their material advantages. The form herein described is merely a preferred exemplary embodiment thereof.

I claim:

1. A method for precisely controlling a rate of receiving grain from a grain truck by precisely controlling and then securing a variably sized opening of a gate for permitting flow of dry bulk particulate matter, comprising the steps of:
   providing a grain truck;
   providing a grain pit;
   providing a grain handling system;
   providing a rack, not coupled to and not transported by said grain truck;
   providing a grain gate, coupled to said rack and configured for translating with said rack;
   providing rotatable pinon gear;
   providing a shaft coupled to said rotatable pinon gear;
   rotating said shaft and thereby translating said rack and varying a gate opening size characteristic; and
   securing with a lock said shaft and thereby restricting variation of said gate opening size characteristic, wherein said step of securing with a lock restricts each of: increasing said gate opening size characteristic and decreasing said gate opening size characteristic.

2. A method for precisely controlling a rate of receiving grain from a grain truck by precisely controlling and then securing a variably sized opening of a gate for permitting flow of dry bulk particulate matter, comprising the steps of:
   providing a grain truck;
   providing a grain pit;
   providing a grain handling system;
   providing a rack;
   providing a grain gate, coupled to said rack and configured for translating with said rack;
   providing rotatable pinon gear;
   providing a shaft coupled to said rotatable pinon gear;
   rotating said shaft and thereby translating said rack and varying a gate opening size characteristic;
   securing with a lock said shaft and thereby restricting variation of said gate opening size characteristic;
   providing a sleeve, with an exit hole therethrough;
   providing a pin;
   wherein said shaft is sized and configured so as to permit therethrough a diameter hole sized and configured to permit portions of said pin to pass through said diameter hole;
   inserting said pin through said diameter hole and said exit hole; and
   locking said pin in said diameter hole.

3. The method of claim 2 wherein said step of locking said pin in said diameter hole at least includes the steps of:
   providing on said sleeve, a first fixed arm with first fixed arm open hole, and a second fixed arm;

providing a swing arm rotatably coupled to said second fixed arm, where said swing arm has a pivot hole and a swing arm open hole;

pivoting said swing arm so that said swing arm open hole is aligned with said first fixed arm open hole; and inserting a paddle lock through said swing arm open hole and said first fixed arm open hole.

4. The method of claim 2 wherein:

said pin has a pin handle end and an opposing insertion end; and wherein said step of locking said pin in said diameter hole at least includes the steps of:
- providing a pin locking end attachment, configured to lock onto said insertion end; and
- locking said pin locking end attachment to said insertion end.

5. The method of claim 2 further comprising the steps of:

providing a rack latch configured to restrict translation of said rack along a longitudinal axis thereof.

6. The method of claim 5 wherein said rack latch prohibits translation in a first direction and permits translation in an opposing direction.

7. The method of claim 6 wherein said step of securing with a lock restricts each of: increasing said gate opening size characteristic and decreasing said gate opening size characteristic.

8. A grain distribution system comprising:

a grain transporting vehicle;

a grain pit;

a grain handling system;

a rack, not coupled to and not transported by said grain transporting vehicle;

a grain gate, coupled to said rack and configured for translating with said rack;

a rotatable pinon gear;

a shaft coupled to said rotatable pinon gear;

a rack latch configured to selectively engage said rack between, teeth thereon, and thereby restrict translation of said rack along a longitudinal axis thereof, wherein said rack latch prohibits translation in a first direction and permits translation in an opposing direction; and a lock coupled through said shaft and thereby restricting variation of said gate opening size characteristic from each of: increasing said gate opening size characteristic and decreasing said gate opening size characteristic.

9. A grain distribution system comprising:

a grain transporting vehicle;

a grain pit;

a grain handling system;

a rack;

a grain gate, coupled to said rack and configured for translating with said rack;

a rotatable pinon gear;

a shaft coupled to said rotatable pinon gear;

a rack latch configured to selectively engage said rack between, teeth thereon, and thereby restrict translation of said rack along a longitudinal axis thereof, wherein said rack latch prohibits translation in a first direction and permits translation in an opposing direction;

a lock coupled through said shaft and thereby restricting variation of said gate opening size characteristic from each of: increasing said gate opening size characteristic and decreasing said gate opening size characteristic;

a sleeve, with an exit hole therethrough;

a pin; and wherein said shaft is sized and configured to permit therethrough a diameter hole sized and configured to permit portions of said pin to pass through said diameter hole.

10. The system of claim 9 further comprising:

disposed on said sleeve, a first fixed arm with first fixed arm open hole, and a second fixed arm;

a swing arm rotatably coupled to said second fixed arm, where said swing arm has a pivot hole and a swing arm open hole; and said swing arm being sized and configured so that said swing arm open hole is alignable with said first fixed arm open hole.

11. A grain gate system comprising:

a rack;

a grain gate, coupled to said rack and configured for translating with said rack;

a rotatable pinon gear;

a shaft coupled to said rotatable pinon gear;

a rigid sleeve member, with an exit hole therethrough;

a pin;

wherein said shaft is sized and configured to permit therethrough a diameter hole sized and configured to permit portions of said pin to pass through said diameter hole;

disposed on said rigid sleeve member, a first fixed arm with first fixed arm open hole, and a second fixed arm;

a swing arm rotatably coupled to said second fixed arm, where said swing arm has a pivot hole and a swing arm open hole; and said swing arm being sized and configured so that said swing arm open hole is alignable with said first fixed arm open hole.

12. The system of claim 11 further comprising:

a one-directional rack latch configured to selectively engage said rack, between teeth thereon, and thereby restrict translation of said rack along a longitudinal axis thereof, wherein said one-directional rack latch prohibits longitudinal translation only in a first direction and permits translation in an opposing direction; and a means for locking, being coupled through said swing arm open hole and said first fixed arm open hole, thereby restricts variation of a gate opening size characteristic from each of: increasing said gate opening size characteristic and decreasing said gate opening size characteristic.

\* \* \* \* \*